United States Patent [19]

Bianco et al.

[11] Patent Number: 5,841,555
[45] Date of Patent: *Nov. 24, 1998

[54] SECURE OPTICAL IDENTIFICATION METHOD AND MEANS

[75] Inventors: James S. Bianco, Enfield, Conn.; David J. Horan, Westfield, Mass.

[73] Assignee: Control Module Inc., Enfield, Conn.

[*] Notice: The term of this patent shall not extend beyond the expiration date of Pat. No. 5,627,663.

[21] Appl. No.: 852,181

[22] Filed: May 6, 1997

Related U.S. Application Data

[63] Continuation of Ser. No. 497,778, Jul. 3, 1995, Pat. No. 5,627,663, which is a continuation of Ser. No. 115,412, Aug. 31, 1993, abandoned.

[51] Int. Cl.$^6$ .............................. G03H 1/00; G06K 7/10; B42D 15/00
[52] U.S. Cl. .................................. 359/2; 359/572; 359/1; 235/457; 283/86
[58] Field of Search .................... 359/1, 2, 572; 283/86; 235/457, 494

[56] References Cited

U.S. PATENT DOCUMENTS

| 4,034,211 | 7/1977 | Horst et al. | 359/572 |
| 4,108,367 | 8/1978 | Hannan | 359/2 |
| 5,627,663 | 5/1997 | Horan | 359/2 |

Primary Examiner—Cassandra C. Spyrou
Assistant Examiner—Audrey Chang
Attorney, Agent, or Firm—John H. Crozier

[57] ABSTRACT

A method of providing secure identification for an article, including: providing on the article a diffraction grating strip including a pattern of a series of diffraction grating elements, each the diffraction grating element to diffract light, from a light source, in one of at least three selected different planes; serially illuminating the diffraction grating elements, detecting changes in plane of diffracted light as the diffraction grating elements are serially illuminated, and generating first information representative of the changes in plane; storing the first information representative of the changes in plane; subsequently, serially illuminating the diffraction grating elements, detecting changes in plane of diffracted light as the diffraction grating elements are serially illuminated, and generating second information representative of the changes in plane; and then, comparing the first and second information to determine the authenticity or not of the article. A coded pattern may be placed on the diffraction grating strip, with one of the coded pattern and the pattern of diffraction grating elements precessing with respect to the other and the coded pattern is read, stored, and compared as part of the first and second information, as above.

12 Claims, 11 Drawing Sheets

SECURE OPTICAL IDENTIFICATION METHOD AND MEANS

CROSS-REFERENCE TO RELATED APPLICATIONS

The present application is a continuation of application Ser. No. 08/497,778, filed Jul. 3, 1995, now U.S. Pat. No. 5,627,663, issued May 6, 1997, which is a continuation of application Ser. No. 08/115,412, filed Aug. 31, 1993, now abandoned.

BACKGROUND OF THE INVENTION

1. Field of the Invention

The present invention relates to secure identification generally and, more particularly, but not by way of limitation, to unique identification method and means that employ a compound diffraction grating strip.

2. Background Art

Identification has become increasingly more important in a variety of settings. For example, employee identification cards may be used to gain access to security areas of a facility and/or in time and attendance reporting. Drivers' licenses are often used to verify the identification of the possessors thereof. Various types of credit and debit cards are employed to make purchases, obtain cash or traveler's checks, and/or to transfer funds, for example. In all of these settings, forgery and copying of such identification means result in the compromising of secret information and the loss of hundreds of millions of dollars worth of merchandise and cash annually. In many cases, credit card type identification is verified at the point of sale; however, as the need for more unattended credit card use expands, there is a greater need to verify the authenticity of the credit card to which the transaction is being charged.

One of the major methods used by forgers of credit cards is to obtain the numbers encoded on a valid credit card during a legitimate transaction and, at a later time, to include this number on another credit card. When the forged credit card is subsequently used on a transaction, the charge is applied to the valid number and the account of the owner of the valid credit card is charged accordingly. The only way to prevent this type of theft is to computer validate each transaction as the purchase is taking place and to have a cashier check the identification of the person purchasing the items against the name returned by the validation computer. While this procedure is economically justifiable when the purchase is for a relatively large amount and there is a cashier present, it is impossible to use this method for small transactions such as with vending machines, pay telephones, transit charges, automatic teller machines, and a host of other unattended charge applications.

There have also been elaborate attempts to create graphic patterns embellished with holographic photographic images to prevent forged credit cards from easily being produced. However, with today's high-tech criminal element, credit cards and holographic images can be illegally produced and sold at high profits. In addition, this method of security still depends on the human element to inspect the card and identify the holder and to cancel the transaction, if necessary, something not appreciated by most physically exposed cashiers or clerks.

There have been a number of attempts to create secure identification means involving optical and/or magnetic information recorded on identification means. However, none of such known identification means provides a high level of protection against forgery and/or copying. Also, many such identification means do not provide a high degree of assurance that duplicate identification means will not be issued to two or more users.

Accordingly, it is a principal object of the present invention to provide identification method and means to ensure that an identification is authentic and not a forgery and to make this verification without human intervention.

It is a further object of the invention to provide such method and means that makes it extremely difficult to duplicate or forge identification means.

It is an additional object of the invention to provide such method and means that are economical.

It is another object of the invention to provide such method and means that do not require host computer support.

It is yet a further object of the invention to provide such method and means that render highly unlikely that duplicate identification means will be issued to two or more users thereof.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a method of providing secure identification for an article, comprising: providing on said article a diffraction grating strip comprising a pattern of a series of diffraction grating elements, each said diffraction grating element to diffract light, from a light source, in one of at least three selected different planes; serially illuminating said diffraction grating elements, detecting changes in plane of diffracted light as said diffraction grating elements are serially illuminated, and generating first information representative of said changes in plane; storing said first information representative of said changes in plane; subsequently, serially illuminating said diffraction grating elements, detecting changes in plane of diffracted light as said diffraction grating elements are serially illuminated, and generating second information representative of said changes in plane; and then, comparing said first and second information to determine the authenticity or not of said article.

In a further aspect of the invention, a coded pattern is placed on said diffraction grating strip, with one of said coded pattern and said pattern of diffraction grating elements precessing with respect to the other and the coded pattern is read, stored, and compared as part of said first and second information, as above.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which.

DETAILED DESCRIPTION OF THE PREFERRED EMBODIMENTS

Figure 1:
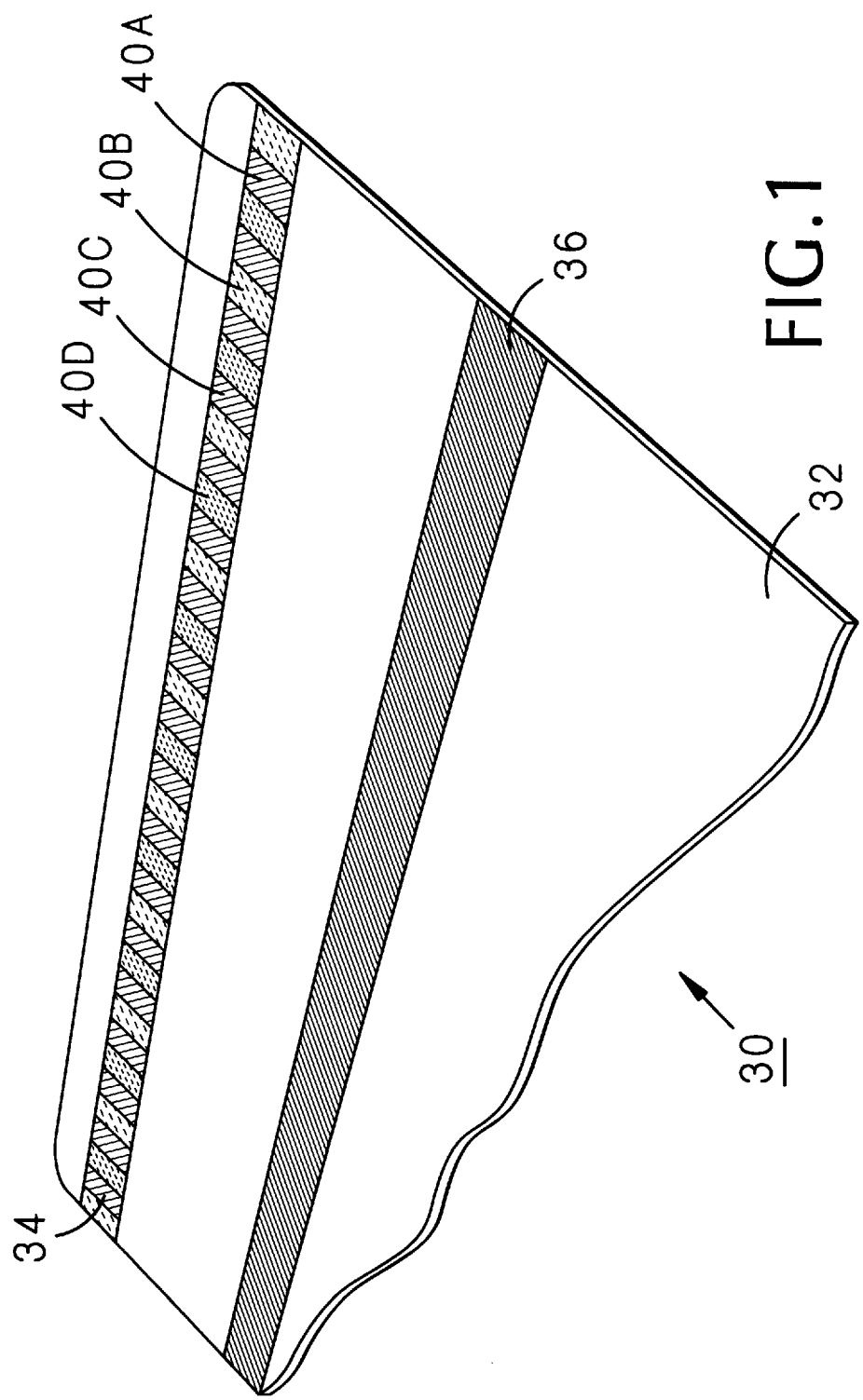
FIG. 1 is an enlarged, fragmentary, perspective view of an identification card with a secure optical identification illustrating one aspect of the present invention.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

FIG. 1 illustrates an identification card, generally indicated by the reference numeral 30, which may be assumed to be a bank credit card, or employee identification card, or the like. Card 30 includes a substrate 32 which has disposed thereon a foil strip 34 containing a plurality of diffraction grating elements. Substrate 32 may have disposed thereon a conventional magnetic strip 36 in which information may be magnetically encrypted. Magnetic strip 36 may be separate from foil strip 34, as shown on FIG. 1, or it may have the foil strip superjacent it, such as is described in U.S. Pat. No. 4,631,222, issued Dec. 23, 1986, to Sander, and titled EMBOSSING FOILS, and U.S. Pat. No. 4,684, issued Aug. 4, 1987, to Colgate, and titled SECURITY TAPE WITH INTEGRATED HOLOGRAM AND MAGNETIC STRIP, the disclosures of which patents are incorporated by reference hereinto.

Foil strip 34 is parallel to and spaced from the upper edge of card 30 and comprises a linear array of diffraction grating elements 40, designated as 40A, 40B, 40C, and 40D, to indicate A, B, C, and D type gratings and, thus, will diffract light in different planes. In the particular embodiment shown, all diffraction grating elements 40 are identical, except that the rotational orientation of each type uniquely differs from the others. Grating elements 40 are arranged so as to form sequential patterns, i.e., D, B, A, D, C, A, B . . . , with, preferably, no two adjacent gratings of the same type. Foil strip 34 can be produced by any conventional technique, such as photographic or embossing techniques used in the art. The sequential patterns can be made highly variable to provide protection against two or more cards 30 with identical strips 34 being issued. Techniques for producing the high degree of variability are disclosed in copending U.S. Pat. applications Ser. Nos. 07/962,931 and 07/962,934, filed Oct. 19, 1992, the latter now U.S. Pat. No. 5,465,176, issued Nov. 7, 1995, which applications are continuations-in-part of Ser. No. 07/957,882, filed Oct. 7, 1993, abandoned, which is a continuation-in-part of Ser. No. 07/921,460, filed Jul. 28, 1992, abandoned, which is a continuation-in-part of Ser. No. 07/857,729, filed Mar. 26, 1992, abandoned, which is a continuation-in-part of Ser. No. 07/810,483, filed Dec. 19, 1991, abandoned, the disclosures of which applications are incorporated by reference hereinto.

Additional variability can be introduced when foil strips 34 are introduced during the manufacture of cards 30. In such manufacture of a standard credit card, for example, a foil segment of 3.785 inches in length is used in producing a 3½-inch card. In producing the sheets from which lengths of segments are cut, with an embossing roll, for example, it is only necessary to ensure that the diameter of the roll is such that the pattern will increment one element 40 at a time through a length of 3.785 inches before repeating. In effect, then, foil strip 34 is placed on substrate 32 in a random manner positionally.

Figure 2:
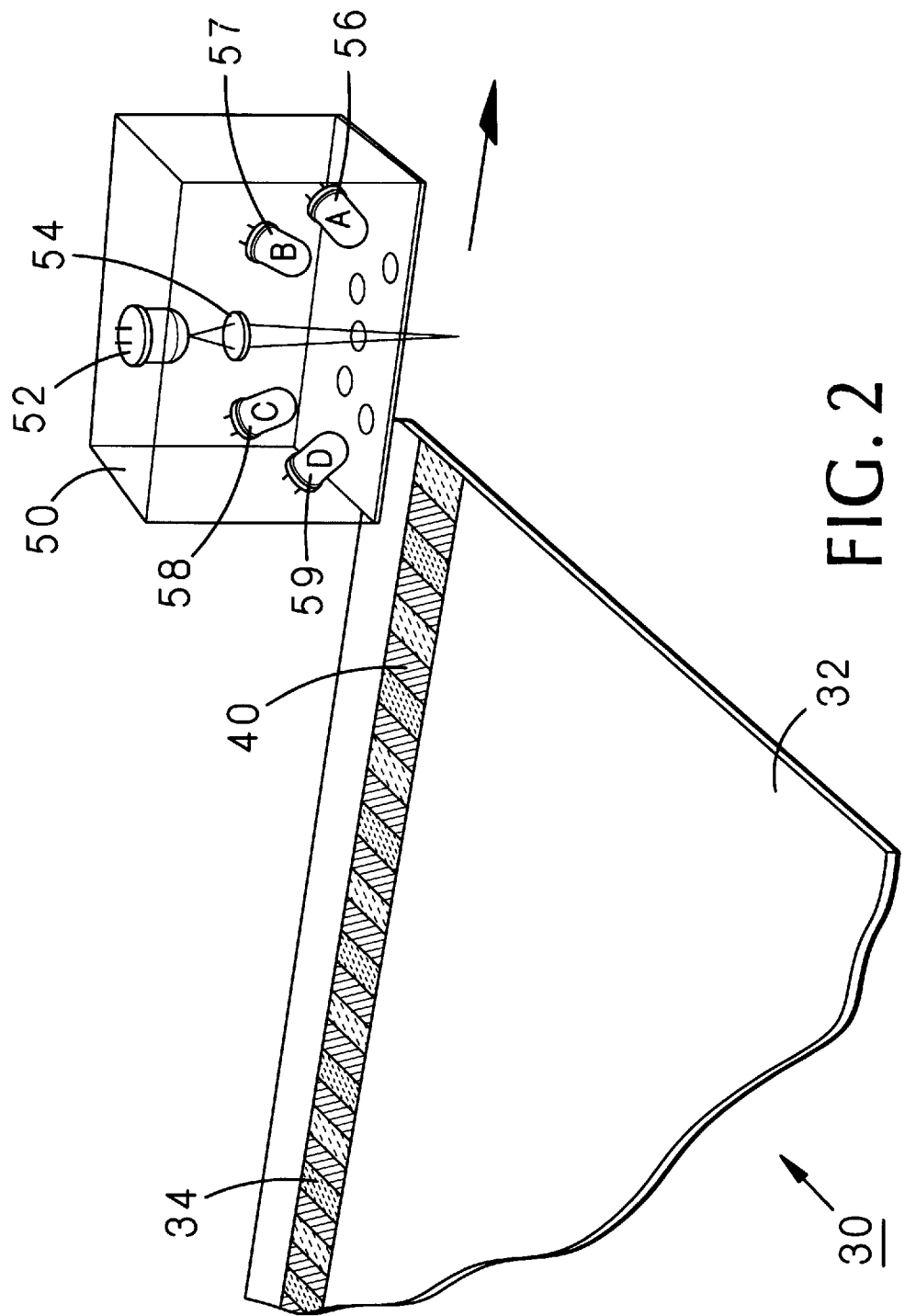
FIG. 2 is an enlarged, fragmentary, perspective, schematic view of an apparatus for reading the optical identification of FIG. 1.

Referring now to FIG. 2, an optical block 50 is disposed above foil strip 34 so as to sequentially detect grating elements 40 as card 50 is moved relative to the optical block as indicated by the arrow. Optical block 50 includes a light source 52 and a lens 54 arranged to direct light orthogonally onto strip 34 to serially illuminate elements 40. Disposed within optical block 50 are four photodetectors 56–59 arranged so as to receive light diffracted by elements 40A–40D, respectively. Thus, one of photodetectors 56–59 will output a signal as each element 40 passes under optical block 50 and the light is diffracted in one of four optical planes. This is illustrated on FIG. 3, for example, where element 40A is illuminated by light source 52 and that element diffracts light to photodetector 56. Likewise, on FIG. 4, element 40B is illuminated by light source 52 and that element diffracts light to photodetector 57.

Providing light source 52 as a 0.3 milliwatt laser diode producing light at 780 nanometers with a 0.007×0.021-inch spot has been found to be satisfactory for detecting diffraction grating elements 40. Other combinations can be employed as well.

The process of how an identifying number is derived from foil strip 34 (FIG. 1) will be described with reference to FIG. 3. It will be assumed, for illustrative purposes only, that card 30 is a standard bank credit card and that each diffraction grating element is 0.034-inch in width.

A pattern identification number, "X", for example, consists of a synchronization number followed by a 16 bit binary number. Information may be encoded in the grating pattern by the grating transition sequence according to the following table, for example:

AB=1
AC=1
BC=1
BA=0
CA=0
CB=0

The start of each grating number is marked by a unique grating sequence referred to as a "synchronization character". Synchronization characters are encoded as a "DBAB" sequence. Since only "D" gratings are used in the synchronization character, this unique sequence provides a means for identifying the start of each grating number. The asymmetry of the synchronization pattern allows the direction in which the grating sequence is read to be determined, i.e., "DBAD" versus "DABD".

A 16 bit grating number is formed from four six bit digits. A complete grating number consists of 28 grating elements: four synchronization characters followed by 24 gratings (4×6).

Figure 3:
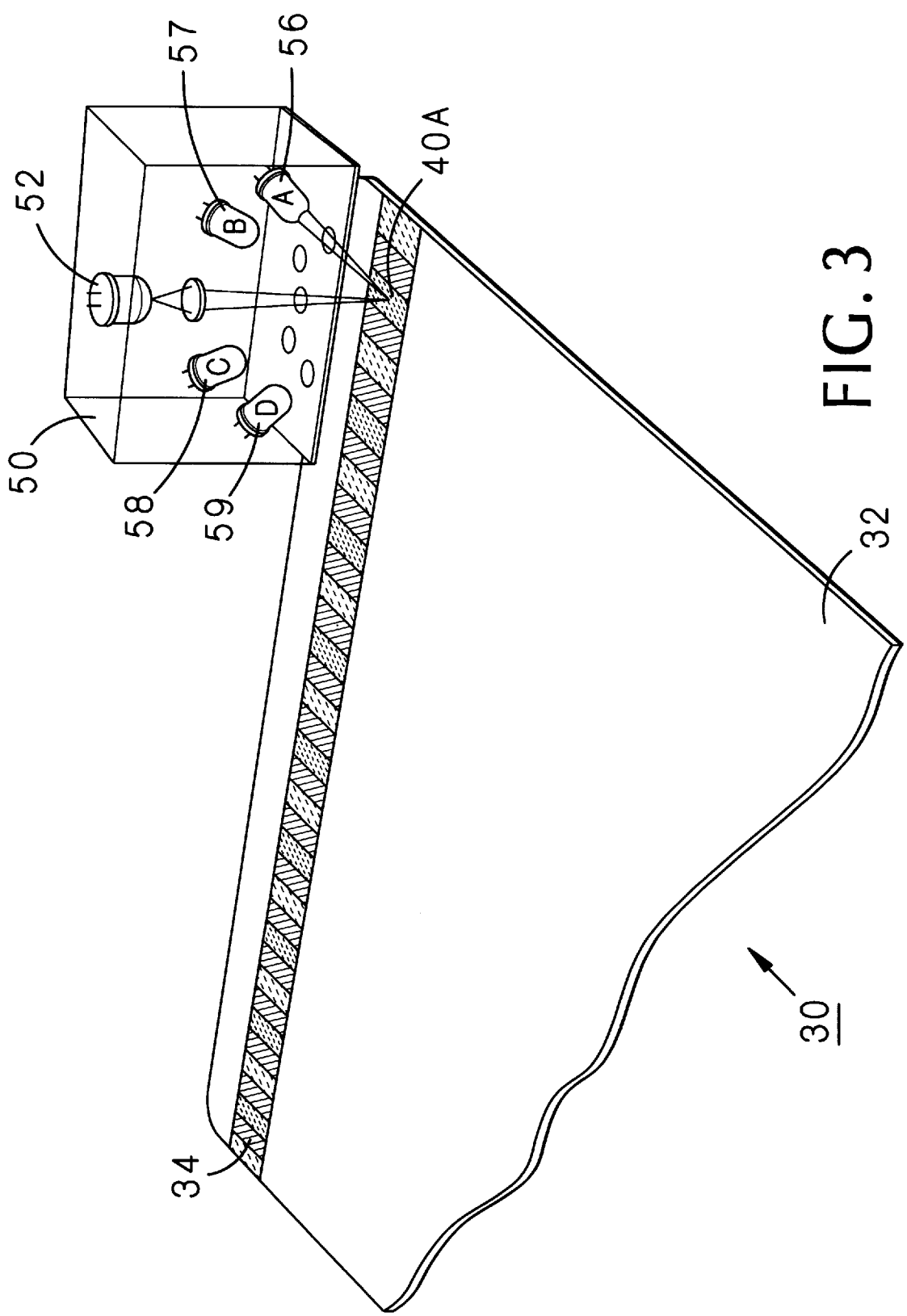
FIGS. 3 and 4 are enlarged, top plan views illustrating how the apparatus of FIG. 2 reads the optical identification of FIG. 1.
Figure 4:
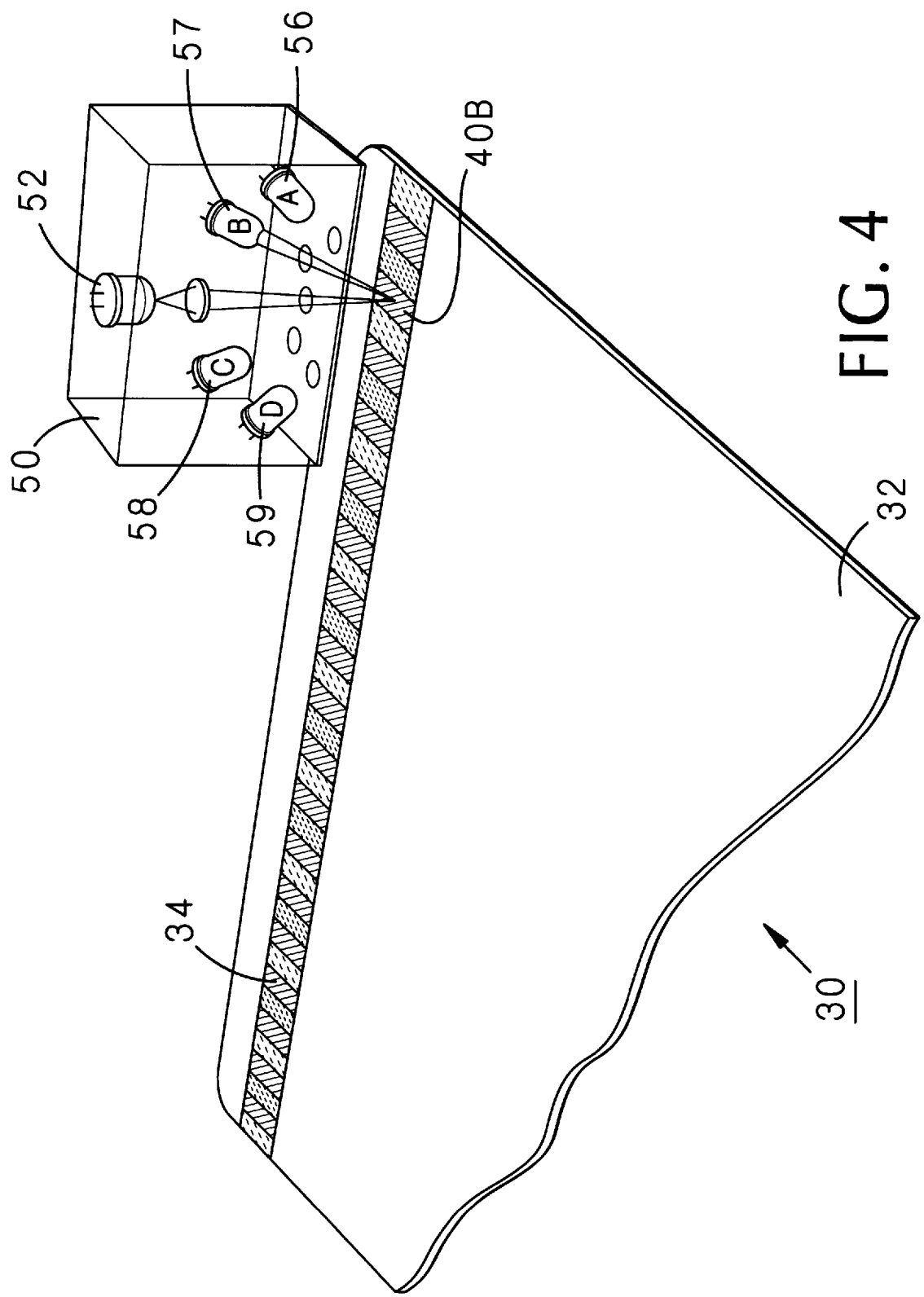

Referring to FIG. 3 and recalling from above that foil strip 34 is placed on card 30 in essentially a random manner with respect to the edge of the card, there will be an offset, "sync offset", from the edge of the first readable grating element 40 card to the first synchronization character, the sync offset being, in the assumed case, between 0 and 27 grating elements in length. During the reading process, the first readable grating element 40 is detected, the number of grating elements to the first synchronization character is counted, and the first grating number, "X", is decoded. Then the second grating number "X+1", is decoded, etc. Depending on the placement of foil strip 34 on card 30, either three or four grating numbers will be present. The card identification number consists of the sync offset plus one or more of the grating numbers. This card identification number can then be encrypted and may be encoded in magnetic strip 36 (FIG. 1) on card 30 and/or stored in a validation computer.

The use of the first readable grating element 40 is advantageous over, for example, using the edge of card 30 as a reference point. The latter has the disadvantage that, as the card wears, the reference point would be moving. Since a diffraction grating element 40, of the size under consideration, can be read when little as 10 percent of the width of the grating element is present, the use of the first readable grating element as a reference point means that the edge of card 30 can wear at least nine-tenths of a grating element width (plus whatever fraction of a grating element precedes it) before the reference point is changed. To allow for further wear, the validation process permits the sync offset to vary plus or minus one grating element width. This allowance also compensates for the situation, for example, in which an encoding reader is not sensitive enough to read a small sliver of grating element 40, but the validation reader does read the sliver.

The preferred method for encrypting the card identification number is to encrypt the image data with a user's account or other identification number and with a secret password known only to the issuer of card 30. When card 30 is subsequently presented for authentication, foil strip 34 is read in the manner described above and also the information in magnetic strip 36 is read. The image data and the account number read are then used by a security module to decipher the encrypted information and generate a password. If the calculated password is identical to the user's secret password, the card is presumed to be authentic.

Figure 5:
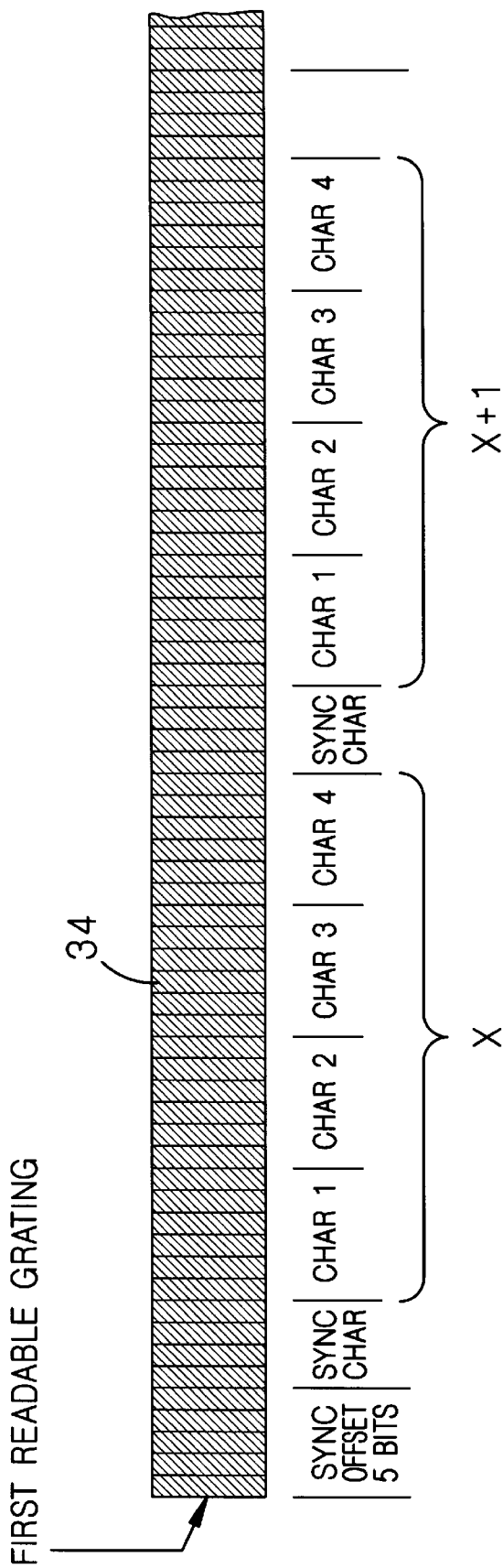
FIG. 5 is a top plan view indicating how an identifying number is derived for the optical identification of FIG. 1.

It is preferable that the grating numbers on a card bear some determinable relationship to one another, such as is indicated on FIG. 5. This permits authentication of card 30 when, say, only the first grating number is used in determining the card number, as above, but one or more gratings in the first grating number have been destroyed and that number cannot be read directly. Knowing the relationship between the first grating number and one or more other grating numbers permits reconstruction of the first grating. Also, it is useful to check all the grating numbers on foil strip 34 so make sure that they are authentic. This requires that a forger forge the entire strip, not just the portion thereof used in generating a card identification number.

Figure 6:
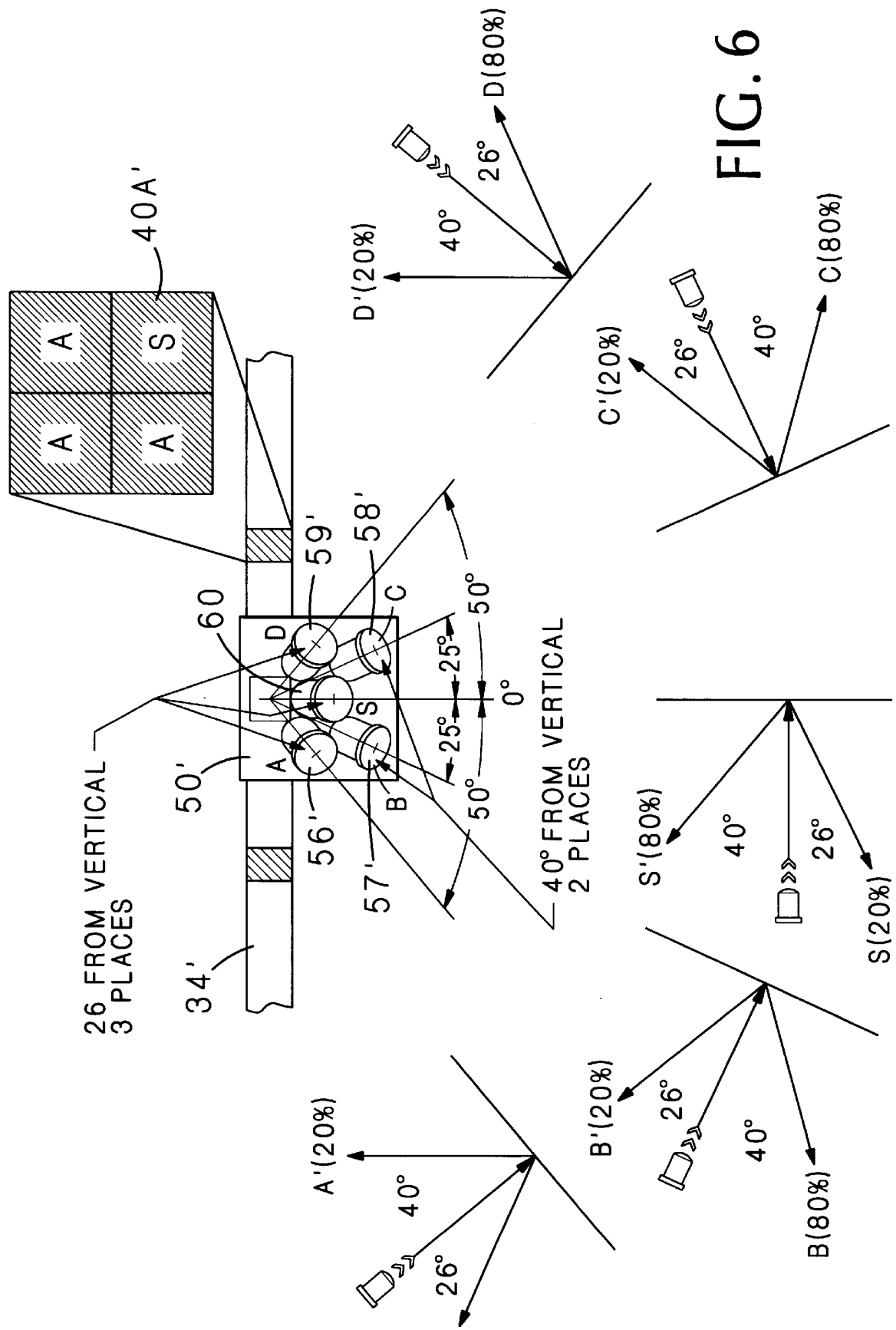
FIG. 6 is an enlarged, fragmentary, top plan view of an alternative secure optical identification being read.

When symmetrical grating elements 40 are employed, it is possible to use certain "contact" copying processes to copy foil strip 34 and, thereby, make unauthorized duplicates of card 30. To avoid such contact copying, grating elements formed from asymmetrical grating segments may be employed, such as in grating element 40A' shown on FIG. 6. Grating element 40A' comprises three quadrants of asymmetrical 80/20 "A" grating and the fourth quadrant of an asymmetrical 80/20 "S" grating. It will be understood that similar asymmetrical 80/20 grating elements 40B'–40D' would be present in foil strip 34', each having a quadrant of asymmetrical 80/20 "S" grating.

An optical block 50' is positioned above foil strip 34' to read the strip as described above with reference to FIGS. 2–4. (The light source is not shown on FIG. 6, for greater clarity.) A photodetector 60 is provided and oriented, as shown, so as to detect the low intensity beam diffracted by the "S" grating segments, while photodetectors 56'–59' are oriented, as shown, so as to detect the high intensity beams diffracted by the 40A'–40D' gratings, detecting of the latter beams being essentially as described above with reference to FIG. 2. If the asymmetric 80/20 "S" grating is copied using a contact process, that grating will be recorded in the copy as a symmetric grating with a 40 degree diffraction angle. This concept is based on the fact that an asymmetric grating with two diffraction beams at X and –X, with X at the high intensity, approximately 80%, and –X at the lower intensity, approximately 20%, will record as a symmetric grating with two diffraction beams at X and –X having approximately the same intensity, 50%. A contact copy, then, of foil strip 34' will produce symmetric gratings, the intensity of the A, B, C, and D grating will be reduced, and the S diffraction beam will not be detected at all. A card bearing such a contact copied foil strip will be detected as such and can be rejected as not being authentic.

Thus, a secure identification means has been disclosed which provides a high degree of variability to minimize the likelihood that two or more duplicate identification means will be produced. This is due to the variability of the diffraction grating pattern in itself, in part because a large number of different such strips may be employed, and having foil strips 34 and 34' placed on card 30 in a random manner.

It is to be noted that the secure identification means is read without the need for a timing signal being provided on the identification means or derived therefrom, no time reference being required for reading the secure identification means, since all data is in encoded in the transitions. Grating elements 40 may be wide or thinner, they can overlap, and/or they can overlap, none of which will affect the operation of the invention. Also, diffraction efficiency is unimportant, since the invention does not measure amplitude, only the presence or absence of a grating element 40.

Figure 7:
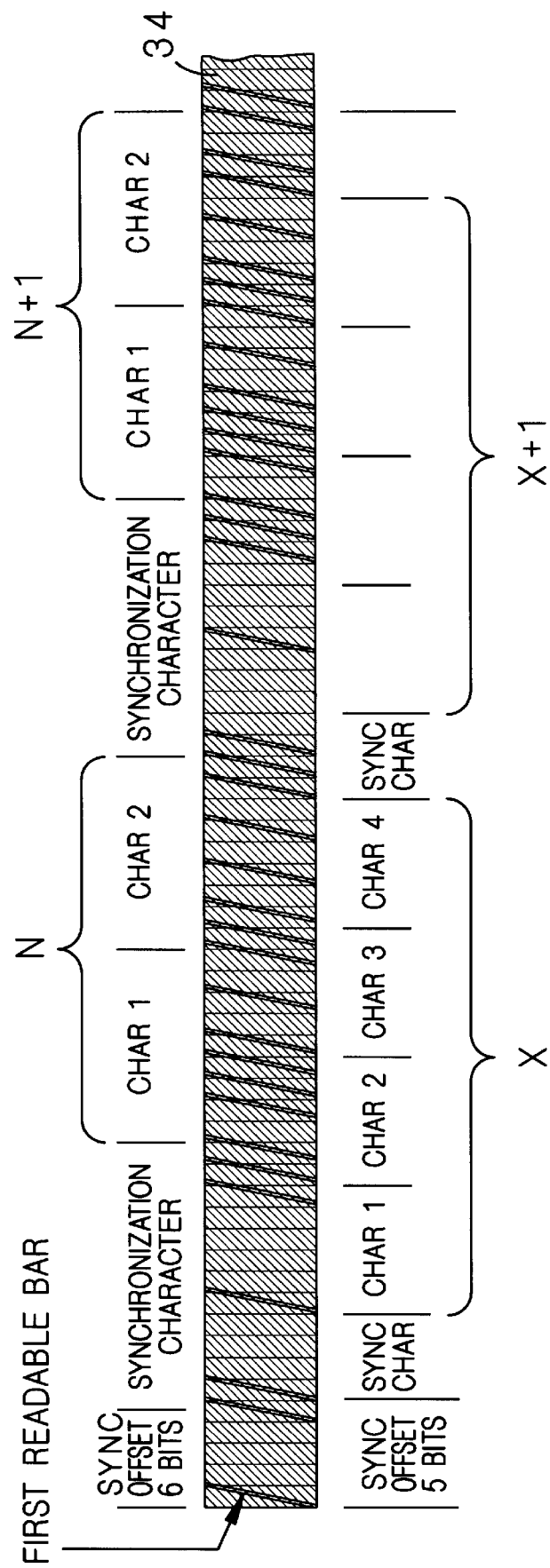
FIG. 7 is an enlarged, fragmentary, top plan view indicating how an additional identifying number is derived for the optical identification of FIG. 1.

To further increase variability, a second encoded identifying number can be placed on foil strip 34 or 34'. FIG. 7 illustrates foil strip 34 with a bar pattern consisting of a series of bars and spaces superposed thereon. Similar to the construction of the grating pattern on foil strip 34, the bar pattern comprises a series of related numbers, here, "N", "N+1", etc. For the embodiment shown, the bar width is always 0.010 inch wide and two different space widths of 0.030 inch and 0.060 inch, "n" and "w", respectively, are used to create the number pattern, with the narrow element used to represent a "1" and the wide element used to represent a "0". A third width of 0.150 inch, known as a superwide or "sw" space is used to form synchronization characters. Numbers are developed by combining a sequence of narrow and wide spaces. The start of a number is identified by a synchronization character formed, in this case, as "nswswnn". This is followed by the two digit hexadecimal representation of the bar number.

Figure 8:
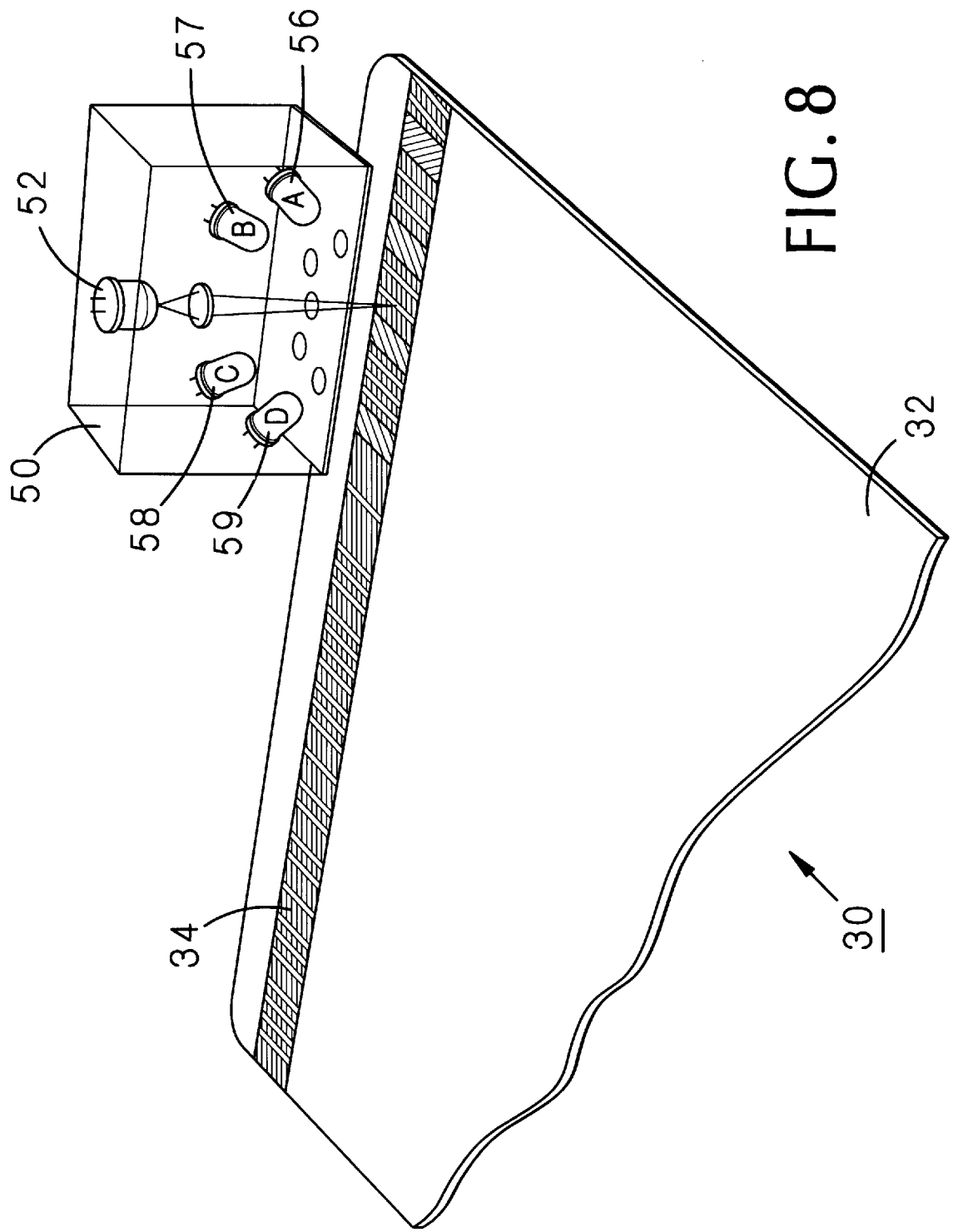
FIG. 8 is an enlarged, fragmentary, perspective view indicating how the apparatus of FIG. 2 reads the additional identifying number of FIG. 7.

An important aspect of the bar pattern is that, although the pattern has a finite length and, therefore, will repeat after that length, it "walks" with respect to foil strip 34, so that it is randomly placed on the foil strip and also appears randomly on a card 30. Consequently, the bar pattern has its own sync offset from the edge of the card to the first synchronization character. Again, as above with respect to the grating pattern, the sync offset of the bar pattern is combined with one or more of the encoded numbers to produce a second card number which may be encrypted in magnetic strip 36 (FIG. 1). As is illustrated on FIG. 8, the bars are detected by optical block 50 as the absence of any signal from photodetectors 56–59. The pattern of bars is decoded using conventional bar code reading techniques.

The use of a uniform, known size of grating elements 40 can be used in reading the bar pattern since they can be used to determine the rate of reading which improves discrimination in measuring the widths of spaces between bars and helps negate the effect of scratches. The bar pattern can also be read with reference to the synchronization character of the grating pattern, rather than the first bar read, in order to eliminate any ambiguity in the bar pattern.

The spaces occupied by the bar pattern can be embossed with an "S" grating to achieve the advantages discussed above with respect to FIG. 6.

The bars of the bar pattern are shown sloped which is the preferred arrangement when the bars are printed on foil strip 34 by a rotogravure process. The bars may also be orthogonal to the axis of foil strip 34 and may be formed by formed by demetallizing areas of foil strip 34 or by means such as heating or the bars may be formed by other printing techniques. One such technique according to the present invention is to use a thermal transfer printer, such as is used in printing conventional bar codes, to melt the bars into a protective layer placed over foil 34. An advantage of this method is that it can be used to personalize card 30 after it has been manufactured. A large number of unique number sets and offsets can be provided with this method.

Figure 9:
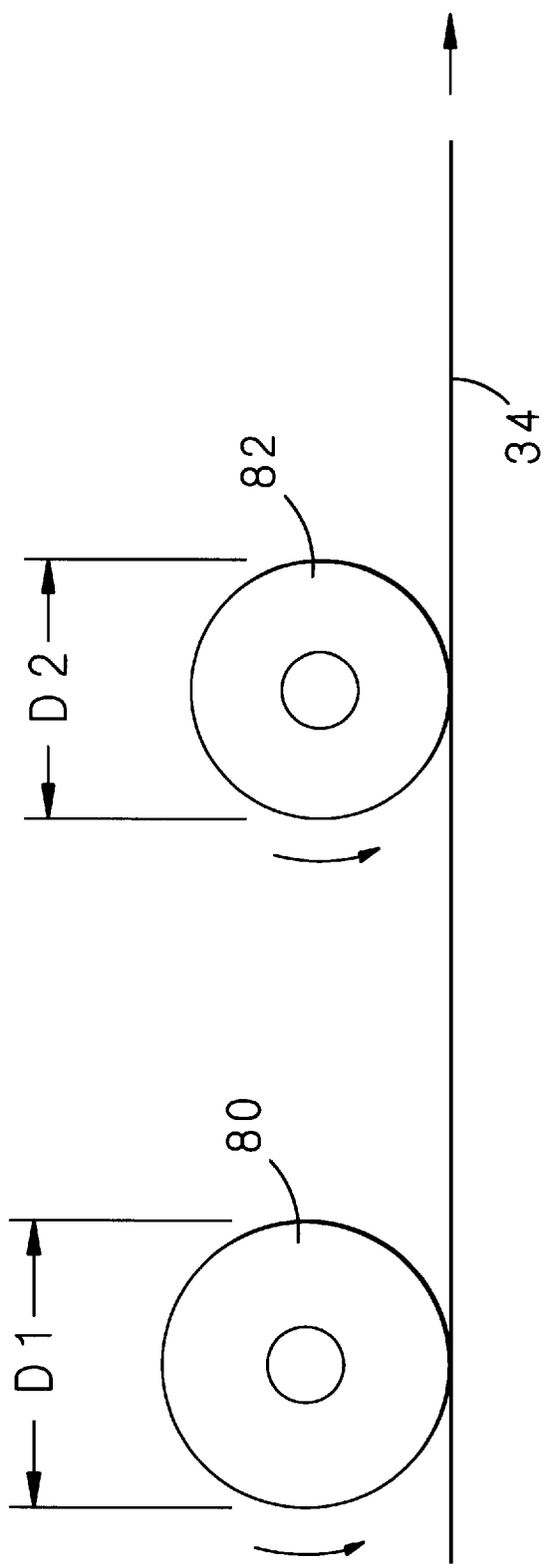
FIG. 9 is a schematic side elevational view indicating how the relative patterns of FIGS. 5 and 7 can be made to shift.

When the sheet from which foil strip 34 is produced is roll embossed, the diameter of the rotogravure printing roll will be selected to provide precession of one of the bar and grating patterns with respect to the other with as high a degree of variability as possible. For example, with reference to FIG. 9, in producing foil strip 34, rotogravure roll 80 will be selected to have a diameter "D1", while a roll 82 will be selected to have a diameter "D2", differing from "D1". Ideally, the difference in lengths of the grating pattern and the bar pattern between repeating patterns of each, divided by the width of a grating element 40 (FIG. 1), will be a prime number or a rational fraction. When the bar pattern is produced with a thermal transfer printer, as above, a much greater degree of variability can be provided.

Figure 10:
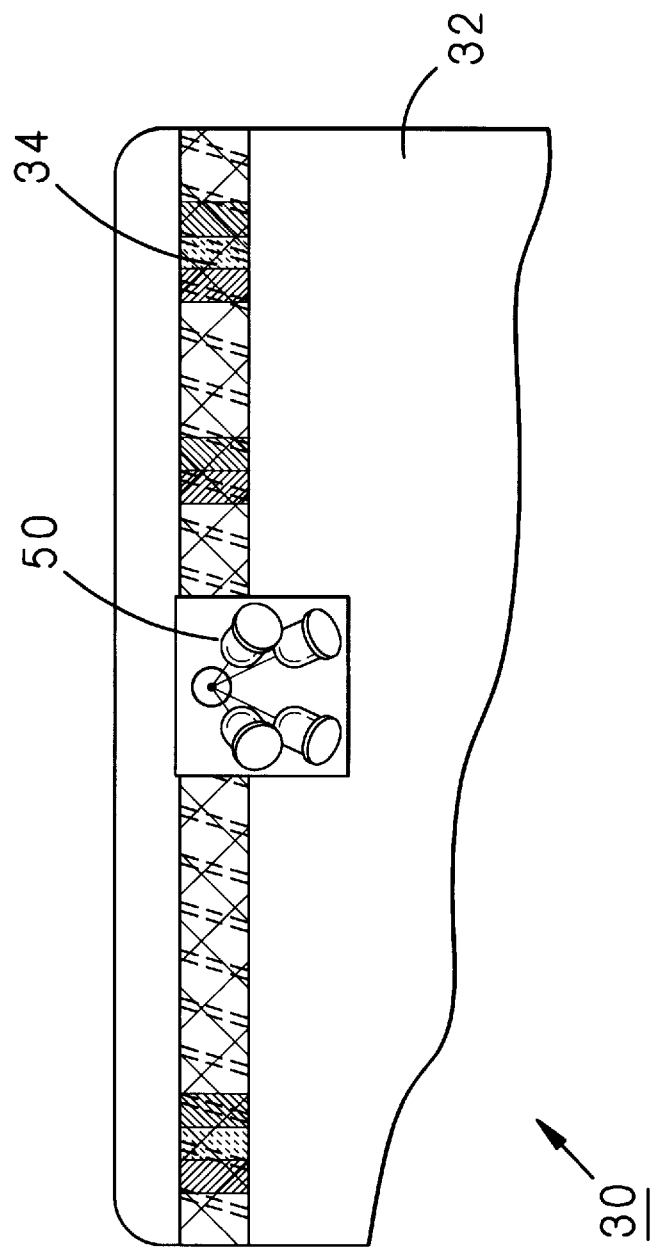
FIG. 10 is an enlarged, fragmentary, perspective view indicating a further method of providing security to the secure optical identification.

FIG. 10 illustrates means by which additional security may be provided for card 30. Here, foil strip 34 has a superposed optical filter, indicated by the cross-hatching, which has spectral response when the strip is being read by IR light, but which filters the lower frequency light required by contact copiers. This renders normal contact copying unusable for duplicating card 30.

Figure 11:
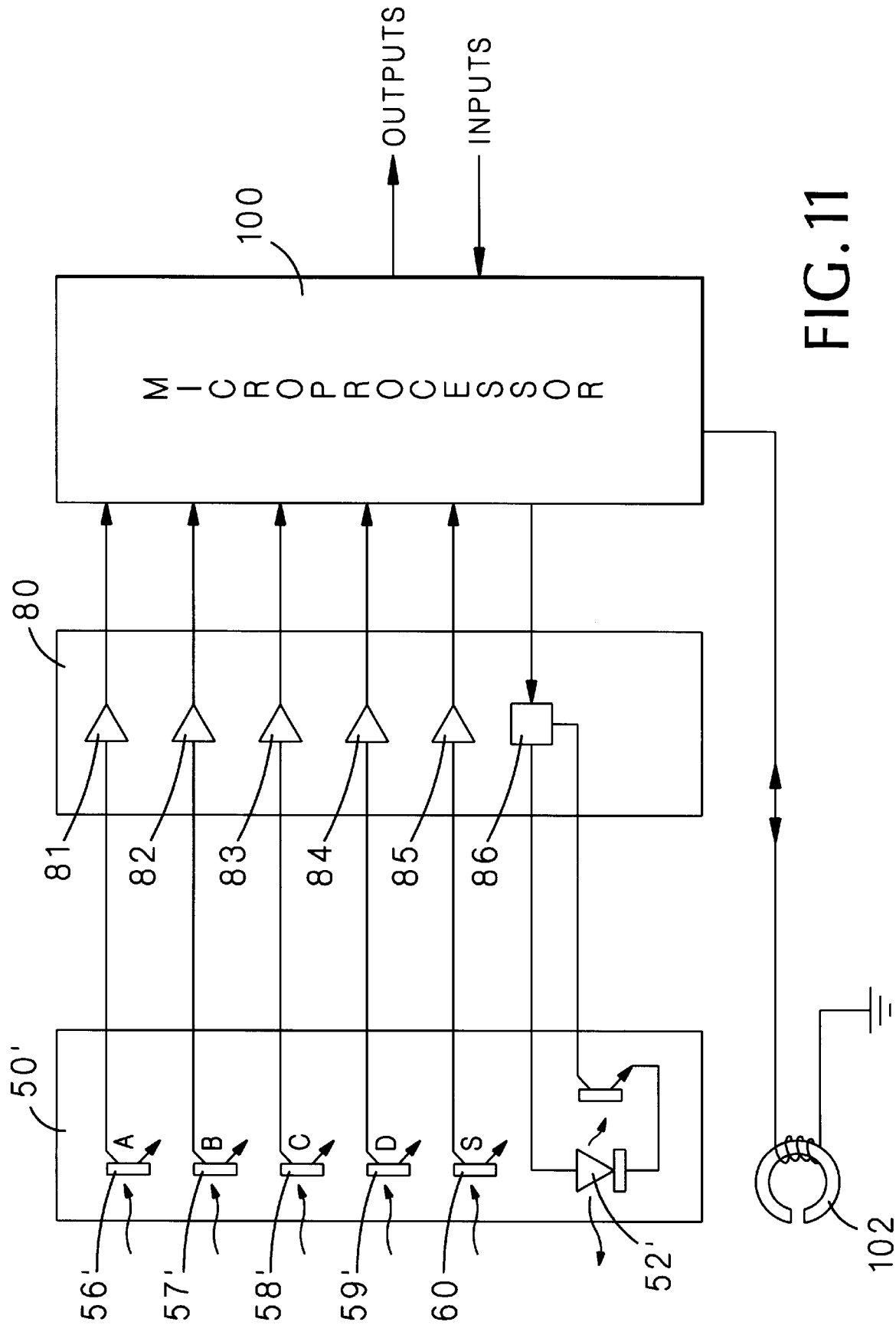
FIG. 11 is a block/schematic diagram illustrating decoding/encoding circuitry for the present invention.

FIG. 11 illustrates circuitry for reading the diffraction grating elements and the bar pattern on foil strip 34', which includes optical block 50' containing a laser light source 52' and photodetectors 56'–59' and 60. Optical block 50' is connected to a signal conditioner 80 which includes therein level comparators 81–85 connected to photodetectors 56'–59' and 60, respectively, and a laser controller 90 connected to light source 52'. The elements in signal conditioner 80 are also connected to a microprocessor 100 which includes an internal memory (not shown). A magnetic read/write head 102 may be connected to microprocessor 100 to read the image data in strip 36 (FIG. 1) or the data may be retrieved from a validation computer memory.

When card 30 (FIG. 1) is being encoded, foil strip 34' will be read by optical head 50' and microprocessor 100 will receive signals from signal conditioner 80 representative of the sync offsets for the grating and bar patterns on foil strip 34' and one or more of each of the grating and bar pattern numbers. This information may be encrypted and encoded in magnetic strip 36, as described above, along with other information supplied to microprocessor 100, depending on the use of the card, or it may be stored in a validation computer. This other information may include customer identification, account number, etc. Microprocessor 100 may also provide the card identification numbers to a host computer or an external memory.

When card 30 is presented for authentication, microprocessor 100 will receive inputs representative of the image on foil strip 34' then being read and will receive image information stored in magnetic strip 36 or in a validation computer memory and the microprocessor will then determine authenticity of the card as described above. If the processing is being done by a host computer, then the image information will be transferred to the host computer to do the comparison with image information stored in the host computer.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

We claim:

1. A method of providing secure identification for an article, comprising:

(a) providing on said article a diffraction grating strip comprising a pattern of a series of diffraction grating elements, each said diffraction grating element to diffract light, from a light source, in one of at least three selected different planes, a given length of adjacent ones of said series of diffraction grating elements representing a grating number;

(b) serially illuminating said diffraction grating elements, detecting transitions between changes in plane of diffracted light as said diffraction grating elements are serially illuminated, and generating first information representative of said changes in plane to determine said grating number, said first information being generated from said transitions without the use of a clock;

(c) storing said first information representative of said changes in plane;

(d) subsequently, serially illuminating said diffraction grating elements, detecting transitions between changes in plane of diffracted light as said diffraction grating elements are serially illuminated, and generating second information representative of said changes in plane, said second information being generated from said transitions without the use of a clock; and (e) then, comparing said first and second information to determine the authenticity or not of said article.

2. A method of providing secure identification for an article, as defined in claim 1, further comprising:

(f) step (a) includes placing said diffraction grating strip on said article in a positionally random manner with respect to a physical feature of said article;

(g) step (b) includes measuring the distance from a selected one of said diffraction grating elements to a known plane change sequence on said diffraction grating strip and including said distance in said first information; and (h) step (d) includes measuring the distance from a selected one of said diffraction grating elements to a known plane change sequence on said diffraction grating strip and including said distance in said second information.

3. A method of providing secure identification for an article, as defined in claim 2, wherein measuring said distance from a selected one of said diffraction grating elements comprises measuring the distance from a first said change of plane.

4. A method of providing secure identification for an article, as defined in claim 2, wherein said diffraction grating strip is disposed along an axis and wherein placing said diffraction grating on said article in a positionally random manner with respect to a physical feature of said article comprises placing said diffraction grating on said article in an axially random manner with respect to an edge of said article.

5. A method of providing secure identification for an article, as defined in claim 1, further comprising:

(i) superposing a different coded pattern on said diffraction grating strip, each repetition of one of said coded pattern and said pattern of diffraction grating elements being incrementally displaced with respect to the other of said coded pattern and said diffraction grating strip, compared with the immediately preceding repetition thereof;

(j) step (b) includes reading said coded pattern and including a representation thereof in said first information; and (k) step (d) includes reading said coded pattern and including a representation thereof in said second information.

6. A method of providing secure identification for an article, as defined in claim 5, wherein said steps of reading comprise detecting the absence of light diffracted by said diffraction grating elements.

7. A method of providing secure identification for an article, as defined in claim 5, wherein said diffraction grating strip is disposed along an axis, said method further comprising:

(l) placing said diffraction grating strip on said article in an axially positionally random manner with respect to an edge of said article;

(m) step (b) includes measuring the distance from a first selected element in said coded pattern to a second known element in said coded pattern and including said distance in said first information; and (n) step (d) includes measuring the distance from first selected element to said second selected element and including said distance in said second information.

8. A method of providing secure identification for an article, as defined in claim 5, further comprising placing said coded pattern on said diffraction grating pattern with a thermal transfer printer.

9. A method of providing secure identification for an article, as defined in claim 1, wherein step (b) includes storing said information on a magnetic strip disposed on said article.

10. A method of providing secure identification for an article, as defined in claim 1, further providing said diffraction grating strip including encoded therein two or more different numbers having a predetermined relationship and authenticity or not of said identification means is further determined by decoding said two or more numbers to determine if said predetermined relationship exists therebetween.

11. An article for secure identification, comprising:

(a) a substrate;

(b) a diffraction grating strip disposed on said article and having an axis, said diffraction grating strip comprising a pattern of a series of diffraction grating elements, each said diffraction grating element to diffract light, from a light source, in one of at least three selected different planes;

(c) said diffraction grating strip being disposed on said article in an axially positionally random manner with respect to a physical feature of said article, distance of beginning of said diffraction grating strip from said physical feature being included as an item of information on said substrate.

12. An article for secure identification, as defined in claim 11, wherein said physical feature of said article is an edge of said article.

* * * * *